United States Patent [19]
Kratel et al.

[11] 4,317,762
[45] Mar. 2, 1982

[54] ROOM TEMPERATURE VULCANIZABLE ORGANOPOLYSILOXANE COMPOSITIONS

[75] Inventors: Günter Kratel; Günter Stohr, both of Durach-Bechen; Heinz Scherer, Burghausen, all of Fed. Rep. of Germany

[73] Assignee: Wacker-Chemie GmbH, Munich, Fed. Rep. of Germany

[21] Appl. No.: 144,493

[22] Filed: Apr. 28, 1980

[30] Foreign Application Priority Data

May 2, 1979 [DE] Fed. Rep. of Germany ....... 2917727

[51] Int. Cl.³ .............................................. C08L 83/06
[52] U.S. Cl. .............................. 523/203; 106/308 M; 523/209; 524/506
[58] Field of Search ................ 260/37 SB; 106/308 M

[56] References Cited

U.S. PATENT DOCUMENTS 4,230,826 10/1980 Sommer et al. ..................... 525/102
4,251,432 2/1981 Martin .............................. 260/42.14

FOREIGN PATENT DOCUMENTS 1939544 3/1971 Fed. Rep. of Germany ... 106/308 M

Primary Examiner—Wilbert J. Briggs, Sr.

[57] ABSTRACT

This invention relates to compositions which may be stored under anhydrous conditions, but when exposed to atmospheric moisture, crosslink at room temperature to form elastomers. These compositions contain diorganopolysiloxanes having terminal condensable groups, a silicon compound having at least 3 Si-bonded hydrolyzable groups and an inorganic filler having a surface area of at least 20 m²/g, in which at least a portion of the surface area of the inorganic filler has been modified by having polymerized thereon at least one compound of the general formula $HR^1C=CHX$, 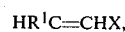

where X represents a —CN group or a group of the formula —COOR², R² is an alkyl radical having from 1 to 4 carbon atoms and R¹ represents hydrogen or a methyl group; or a mixture containing at least one such compound and at least one monomer which has been copolymerized with said compound.

5 Claims, No Drawings

ROOM TEMPERATURE VULCANIZABLE ORGANOPOLYSILOXANE COMPOSITIONS

The present invention relates to room temperature vulcanizable organopolysiloxane compositions and more particularly to room temperature vulcanizable organopolysiloxane compositions containing a modified inorganic filler having a surface area of at least 20 m²/g.

BACKGROUND OF THE INVENTION

Room temperature vulcanizable compositions containing a diorganopolysiloxane having terminal condensable groups, a silicon compound having at least 3 Si-bonded hydrolyzable groups and an inorganic filler having a surface area of at least 50 m²/g in which the surface of the inorganic filler contains organosilyl groups is described in U.S. Pat. No. 3,868,345 to Kratel et al. These compositions may be stored under anhydrous conditions, but when exposed to atmospheric moisture, vulcanize at room temperature to form elastomers.

Room temperature vulcanizable organopolysiloxane compositions having improved heat stability are described in U.S. Pat. No. 3,497,570 to Yerrick. These compositions, which are curable in the presence of moisture to form elastomers, contain acyloxy endblocked diorganopolysiloxanes and from 1.0 to 15.0 percent by weight based on the weight of the diorganopolysiloxanes of a polyacrylonitrile. Although, it is known that the heat stability of the resultant elastomers can be improved by the addition of a polyacrylonitrile, it has not been known heretofore that the adhesion of elastomers to a substrate upon which they are formed can be substantially improved by using the modified inorganic filler of this invention.

Thus, compared to the room temperature vulcanizable compositions known heretofore, the compositions of this invention have the advantage that the resultant elastomers exhibit better adhesion on the substrates upon which they have been cured and/or they provide better resistance to rupture.

Therefore, it is an object of this invention to provide a composition which may be stored under anhydrous conditions, but when exposed to atmospheric moisture, cures at room temperature to form an elastomer. Another object of this invention is to provide a room temperature vulcanizable composition containing a modified inorganic filler. Still another object of this invention is to provide a composition which is vulcanizable at room temperature to form an elastomer having improved adhesive properties. A further object of this invention is to provide a composition which when applied to a substrate and cured thereon exhibits improved adhesion to the substrate.

SUMMARY OF THE INVENTION

The foregoing objects and others which will become apparent from the following description are accomplished in accordance with this invention, generally speaking, by providing a composition which may be stored under anhydrous conditions, but when exposed to atmospheric moisture, cures at room temperature to form elastomer, comprising a diorganopolysiloxane having terminal condensable groups, a silicon compound having at least 3 Si-bonded hydrolyzable groups, and an inorganic filler having a surface area of at least 20 m²/g, in which at least a portion of the inorganic filler has been modified by having a polymer polymerized thereon, in which the polymer is obtained from the polymerization of a compound of the general formula

$HR^1C=CHX$, where X represents the —CN group or a group of the formula —$COOR^2$, $R^2$ is an alkyl radical having from 1 to 4 carbon atoms and $R^1$ represents hydrogen or the methyl group, or a mixture containing at least one such compound and at least one monomer which is capable of being copolymerized with such compound.

DETAILED DESCRIPTION OF THE INVENTION

Diorganopolysiloxanes having terminal condensable groups which may be used in this invention are the same diorganopolysiloxanes which have been or could have been used heretofore in the preparation of compositions which can be stored under anhydrous conditions, but when exposed to atmospheric moisture cure at room temperature to form elastomers consisting of diorganopolysiloxanes having terminal condensable groups and a silicon compound having at least 3 Si-bonded hydrolyzable groups. The diorganopolysiloxanes having terminal condensable groups generally used in the preparation of such compositions and which are also used in this invention, can for example, be represented by the general formula:

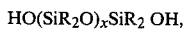

$HO(SiR_2O)_xSiR_2OH$, in which R represents the same or different monovalent hydrocarbon radicals or substituted monovalent hydrocarbon radicals and x represents a number having a value of at least 10.

Within or along the siloxane chains of the above formula, other siloxane units may be present in addition to the diorganosiloxane units ($SiR_2O$) shown in formulas of this type. Examples of such other siloxane units which may be present, generally as impurities, are those having the formulas:

$RSiO_{3/2}$, $R_3SiO_{\frac{1}{2}}$ and $SiO_{4/2}$, where R is the same as above. However, siloxane units other than the diorganosiloxane units preferably do not represent more than about 10 percent and, more preferably, not more than about 1 mole percent based on the total weight of the diorganopolysiloxanes containing the terminal condensable groups. In the above formula, terminal hydroxyl groups on the diorganopolysiloxane may be partially or totally substituted with condensable groups other than the Si-bonded hydroxyl groups. Examples of other condensable groups are alkoxy groups having from 1 to 5 carbon atoms and akoxyalkyleneoxy groups having from 1 to 5 carbon atoms, such as the methoxyethyleneoxy radical, as well as hydrolyzable groups such as those that are present on the silicon compounds described hereinafter as crosslinking agents which contain at least 3 Si-bonded hydrolyzable groups. When the groups present on the diorganopolysiloxane are hydrolyzable groups, rather than terminal condensable groups, these hydrolyzable groups need not be the same hydrolyzable groups as those that are present on the silicon crosslinking compounds having at least 3 Si-bonded hydrolyzable groups.

Examples of hydrocarbon radicals represented by R above are alkyl radicals such as the methyl, ethyl, n-propyl and the isopropyl radicals, as well as the octadecyl radicals; alkenyl radicals, such as the vinyl and the allyl radicals; cycloaliphatic hydrocarbon radicals such as the cyclopentyl and the cyclohexyl radicals, as well as methylcyclohexyl and cyclohexenyl radicals; aryl radicals such as the phenyl radical and xenyl radicals; aralkyl radicals such as the benzyl, the beta-phenylethyl and the beta-phenylpropyl radicals; as well as alkaryl radicals such as the tolyl radical.

Preferred examples of substituted hydrocarbon radicals represented by R are halogenated aryl radicals such as chlorophenyl and bromophenyl radicals, as well as cyanoalkyl radicals such as the beta-cyanoethyl radical.

Because of their availability, it is preferred that at least 50 percent and, more preferably, at least 90 percent of the number of R radicals, i.e., the SiC-bonded radicals on the diorganopolysiloxanes having terminal condensable groups be methyl radicals.

The diorganopolysiloxanes having terminal condensable groups employed in the compositions of this invention may be homo- or co-polymers or mixtures of different diorganopolysiloxanes having terminal condensable groups.

The viscosity of the diorganopolysiloxanes having terminal condensable groups is preferably between 100 and 500,000 mPa.s at 25° C.

In the preparation of the compositions of this invention, it is possible to use the same silicon compounds having 3 Si-bonded hydrolyzable groups which have been or could have been used heretofore as crosslinking agents in the preparation of compositions which can be stored under anhydrous conditions, but when exposed to moisture at room temperature cure to form elastomers which comprises mixing at least one such silicon compound with a diorganopolysiloxane containing terminal condensable groups.

Examples of silicon compounds having at least 3 Si-bonded hydrolyzable groups which may be used as crosslinking agents in this invention are silanes having the general formula $$R_aSiZ_{4-a'}$$

in which R is the same as above, Z is a hydrolyzable group and a is 0 or 1, and partial hydrolysates thereof containing from 2 to 15 silicon atoms per molecule.

Examples of hydrolyzable groups represented by Z are acyloxy groups (—OOCR′), hydrocarbonoxy groups and substituted hydrocarbonoxy groups (—OR′), hydrocarbonoxy-hydrocarbonoxy groups (—OR″OR′, where R″ is a bivalent hydrocarbon radical, such as —CH$_2$CH$_2$-), aminoxy groups (—ONR′$_2$), amino groups (—NR′$_2$), acyl-amino groups (—NR′-COR′), oxime groups (—ON═CR′$_2$) and phosphate groups [-OOP(OR′)$_2$]. In these formulas, R′ represents the same or different monovalent hydrocarbon radicals or substituted monovalent hydrocarbon radicals. In some of these formulas, at least one R′ may represent hydrogen. The examples of hydrocarbon radicals represented by R are equally applicable to the hydrocarbon radicals represented by R′, and the examples of substituted hydrocarbon radicals represented by R are equally applicable to the substituted hydrocarbon radicals represented by R′.

Examples of acyloxy groups are especially those having from 1 to 18 carbon atoms, such as formyloxy, acetoxy, propionyloxy, valeroyloxy, caproyloxy, myristyloxy and stearoyloxy groups, in which the acetoxy group is the preferred example.

Suitable examples of hydrocarbonoxy groups are alkoxy groups having from 1 to 10 carbon atoms, such as methoxy, ethoxy, n-propoxy, isopropoxy, butoxy, hexyloxy, heptyloxy and octyloxy groups. Examples of other hydrocarbonoxy groups having from 1 to 10 carbon atoms are vinyloxy, allyloxy, ethylallyloxy, isopropenyloxy, butadienyloxy and phenoxy groups.

An example of a hydrocarbonoxy-hydrocarbonoxy group is the methoxyethyleneoxy group.

Examples of aminoxy groups are dimethylaminoxy, diethylaminoxy, dipropylaminoxy, dibutylaminoxy, dioctylaminoxy, diphenylaminoxy, ethylmethylaminoxy and methylphenylaminoxy groups.

Examples of amino groups are n-butylamino, sec-butylamino and cyclohexylamino groups.

An example of oxime groups are acetaldoxime, acetophenoxime, acetonoxime, benzophenonoxime, 2-butanonoxime, diisopropylketoxime and chlorocyclohexanonoxime groups.

Examples of phosphate groups are dimethylphosphate, diethylphosphate, dibutylphosphate, dioctylphosphate, methylethylphosphate, methylphenylphosphate and diphenylphosphate groups.

The silicon compound having at least 3 Si-bonded hydrolyzable groups is preferably used in an amount from 0.5 to 15 percent by weight, based on the weight of the diorganopolysiloxane having terminal condensable groups.

Examples of inorganic fillers having a surface area of at least 20 m$^2$/g which may be used in the preparation of the modified fillers used in this invention are pyrogenically produced silicon dioxides, silicic acid hydrogels which have been dehydrated while maintaining their structure, and other types of precipitated silicon dioxide having a surface area of at least 20 m$^2$/g and metal oxides such as titanium dioxide, ferric oxide, aluminum oxide and zinc oxide, provided that they have a surface area of at least 20 m$^2$/g. Pyrogenically produced silicon dioxides having a surface area of 50 to 600 m$^2$/g, and especially those having a surface area of from 120 to 150 m$^2$/g, are preferred. (The values cited herein are BET values, which are obtained by nitrogen absorption in accordance with ASTM Special Technical Publication, No. 51, 1941, page 95).

Examples of compounds of the general formula $$HR^1C\!=\!CHX,$$

where X represents the —CN group or a group of the formula —CORR$^2$, where R$^2$ is an alkyl radical having 1 to 4 carbon atoms, and R$^1$ represents hydrogen or the methyl group, are acrylonitrile, acrylic acid esters such as methacrylate, ethylacrylate, n-propylacrylate, isopropylacrylate and the various isomers of butylacrylate; crotonic acid esters such as crotonic acid methylester, crotonic acid ethylester, crotonic acid-n-propylester, crotonic acid isopropylester and the various isomers of crotonic acid butylesters. Examples of other monomers which can be copolymerized with compounds of this type are vinylacetate and methylacrylic acid ester, such as methylmethacrylate, ethylmethacrylate, the various isomers of propylmethacrylate and the various isomers of butylmethacrylate. It is preferred that the other monomers not exceed about 50 percent by weight, based on the total weight of the compound having the general formula $HR^1C=CHX$ and the other monomers.

Preferably a compound having the general formula $HR^1C=CHX$ or a mixture of at least one such compound and at least one other monomer which is capable of being copolymerized with such a compound is polymerized on the surface of the inorganic filler having a surface area of at least 20 m$^2$/g, in sufficient amount so that following the polymerization step, the filler contains from 0.2 to 35 percent by weight of carbon, and more preferably up to about 7 percent by weight of carbon.

The polymerization of a compound having the general formula $HR^1C$-CHX or a mixture containing such a compound and at least one other monomer which can be copolymerized with the compound on the surface of the inorganic filler having a surface area of at least 20 m$^2$/g, may take place at such temperatures and pressures as are generally used for the polymerization or copolymerization of a compound having the formula $HR^1C$-CHX. In preparing the modified inorganic filler of this invention, it is preferred that the compound having the formula $HR^1C=CHX$, or a mixture of such a compound and at least one other monomer which can be copolymerized with said compound, be used in a gaseous form.

The polymerization of a compound having the general formula $HR^1C=CHX$ or the copolymerization of a mixture containing such a compound with at least one other monomer on the surface of an inorganic filler having a surface area of at least 20 m$^2$/g, may be conducted by the same processes which have been or could have been used heretofore in free radical or anionic polymerization or copolymerization of a compound having the general formula $HR^1C=CHX$. The polymerization may be conducted in the presence of peroxide compounds such as benzoyl peroxide or tert-butyl-2-ethyl-hexoate, or with high energy radiation such as by ultraviolet light, or by ultrasound.

If desired, the polymerization of the compound having the general formula $HR^1C=CHX$ or the copolymerization of a mixture of such a compound with at least one other monomer capable of being polymerized with said compound, on the surface of an inorganic filler having a surface area of at least 20 m$^2$/g may take place, for example in a mechanical means, such as a ball mill. However, it is not essential that the polymerization or copolymerization be conducted in a ball mill in order to obtain the modified inorganic filler of this invention.

The inorganic filler having a surface area of at least 20 m$^2$g on whose surface a compound of the general formula $HR^1C$-CHX is polymerized or a mixture of said compound and at least one other monomer is copolymerized, is preferably used in the composition of this invention in an amount of from about 3 to 35 percent by weight and more preferably from about 4 to 12 percent by weight based on the total weight of the composition.

In addition to the diorganopolysiloxane having terminal condensable groups, a silicon compound having at least three Si-bonded hydrolyzable groups and an inorganic filler having a surface area of at least 20 m$^2$/g which has been modified by having a compound of the formula $HR^1C=CHX$ polymerized thereon, or a mixture of such a compound and at least one other monomer copolymerized thereon, other substances which have been or could have been used heretofore in the preparation of compositions which may be stored under anhydrous conditions, but when exposed to atmospheric moisture cure at room temperature to form elastomers may be incorporated in the compositions of this invention. Examples of such substances which may be employed in these compositions are organic fillers having a surface area of at least 20 m$^2$/g which may be modified in a manner other than the inorganic fillers having a surface area of at least 20 m$^2$/g of this invention, inorganic fillers having a surface area less than 20 m$^2$/g, pigments, soluble dyes, odor producing substances, organopolysiloxane resins, including those consisting of $(CH_3)SiO_{1/2}$ and $SiO_{4/2}$ units, organic resins such as polyvinyl chloride powders or powders consisting of homopolymers or copolymers of acrylonitrile, corrosion inhibitors, oxidation inhibitors, heat-stabilizers, solvents, agents which serve to improve the adhesion of the cured elastomers on the surfaces on which they are formed, for example, gamma-glycidyloxypropyltriethoxysilane, condensation catalysts such as tin salts or organotin salts of carboxylic acids, for example dibutyltin dilaurate, plasticizers such as trimethylsiloxy endblocked dimethylpolysiloxanes which are liquid at room temperature, and/or phosphoric acid esters, UV stabilizers and cell-generating substances such as azodicarbonamide.

Examples of fillers having a surface area less than 20 m$^2$/g are for example quartz meal, diatomaceous earth, Neuburg Chalk, calcium silicate, zirconium silicate, calcium carbonate, for example in the form of ground chalk, calcined aluminum silicate and powdery sodium aluminum silicate having molecular sieve properties.

Other fillers which may be used are asbestos and/or glass fibers, especially those having an average length up to about 0.5 mm and/or other organic fibers.

Inorganic fillers having a surface area less than or greater than 20 m$^2$/g other than those of this invention which have a polymer polymerized on its surface, may be treated with a hydrophobic agent to impart hydrophobic properties thereto. They may be treated in a ball mill with, for example, trimethylethoxysilane or stearic acid.

Mixtures of various fillers having a surface area of at least 20 m$^2$/g and/or fillers having a surface area of less than 20 m$^2$/g may be used.

In preparing the compositions of this invention, all of the constituents may be mixed in any desired sequence. It is preferred that the mixing take place at room temperature and under anhydrous conditions. If desired, the mixing process may however take place at higher temperatures, for example at temperatures of from about 35° C. up to about 150° C.

The moisture in the air is sufficient to promote crosslinking of the compositions of this invention. However, if desired crosslinking may take place at temperatures which are higher or lower than room temperature, for example at temperatures between 0° and 10° C., and/or at water concentrations which exceed the moisture content of atmospheric air.

The compositions of this invention exhibit non-slump properties. Consequently, even though the compositions are not crosslinked, they do not flow out of vertical fissures and they do not run off inclined surfaces.

The elastomers prepared from the compositions of this invention adhere well to painted, varnished or unvarnished wood, oxidized, especially electrolytically oxidized aluminum, as well as untreated aluminum and glass, when they are cured on these substrates, even though the substrates were not primed prior to the application of the composition.

Elastomers prepared from the compositions of this invention show excellent adhesion to other materials such as enamel, porcelain and earthenware.

These compositions are also suitable for use as adhesives, putties, coatings and for sealing fissures, including vertical fissures and similar interstices from 1 mm to 50 mm wide. They may be used for example on land, water or airborne vehicles, as well as for building sealants, including those made of light-weight building materials or pre-fabricated components.

In the following examples, all parts and all percentages are by weight unless otherwise specified.

The modified inorganic fillers used in the following examples which have a surface area of at least 20 m$^2$/g and have a polymer polymerized thereon, which is obtained from the polymerization of a compound of the general formula HR$^1$C=CHX or a mixture of such a compound with a polymerizable monomer, are prepared in the following manner:

(a) Under constant stirring, 10 g of gaseous acrylonitrile is added with constant stirring to a mixture containing 55 g of silicon dioxide which was pyrogenically produced in the gaseous phase (fume silica) and having a surface area of 150 m$^2$g and 3 g of a mixture consisting of equal parts by weight of benzoyl peroxide and pyrogenically produced silicon dioxide having a surface area of 200 m$^2$/g. The unreacted acrylonitrile is removed by distilling at 16 mbar (abs.) and after the residue has been kept overnight in a drying chamber at 80° C., the resultant modified silicon dioxide has a surface area of 123 m$^2$/g and a carbon content of 5.06 percent.

(b) The procedure described in (a) above is repeated, except that 10 g of a gaseous mixture consisting of 8 g of acrylonitrile and 2 g of methacrylic acid methylester is substituted for the 10 g of acrylonitrile. The modified silicon dioxide thus obtained has a surface area of 127 m$^2$/g and a carbon content of 4.63 percent.

(c) About 8 g of gaseous acrylonitrile is added with constant agitation to 55 g of fume silica having a surface area of 150 m$^2$/g at a temperature of about 80° C. The resultant mixture is then irradiated for 3 hours with ultraviolet light, using a 300 watt lamp ("Osram Ultra Vita Lux") under constant agitation. After the unreacted acrylonitrile has been removed by distilling at 16 mbar (abs.) and after the residue has been kept overnight in a drying chamber at 80° C., the resultant modified silicon dioxide has a surface area of 147 m$^2$g and a carbon content of 0.72 percent.

(d) About 10 g of gaseous ethylacrylate is added with constant agitation to a mixture containing 55 g of fume silica having a surface area of 150 m$^2$/g and 2.5 g of a powdery mixture consisting of 6 parts of tert-butyl-2-ethylhexaoate and 40 parts of an inert carrier (product "VP 109" of Peroxid Chemie). The mixture is then heated for 6 hours at 125° C. The unreacted acrylic acid ester is distilled off at 16 mbar (abs.) and after storing the residue overnight in a drying chamber at 90° C., the resultant silicon dioxide thus obtained has a surface area of 129 m$^2$/g and a carbon content of 4.54 percent.

(e) The process described in (d) above is repeated, except that 10 g of gaseous crotonic acid ethyl ester is substituted for 10 g of the ethylacrylate.

The modified silicon dioxide thus obtained has a surface area of 116 m$^2$/g and a carbon content of 5.63 percent.

EXAMPLE 1

About 67.5 parts of a hydroxyl terminated dimethylpolysiloxane having a viscosity of 50,000 mPa.s at 25° C., are mixed in a planetary mixer at room temperature and at 10 mbar (abs.) with 20 parts of a trimethylsiloxy endblocked dimethylpolysiloxane having a viscosity of 100 mPa.s at 25° C., 4.5 parts of methyltriacetoxy silane and 8.5 parts of the modified filler indicated in the following Table.

All of the compositions thus obtained are transparent, slump-resistant, and may be stored under anhydrous conditions. When these compositions are exposed to atmospheric moisture, they cure to form an elastomer.

COMPARISON EXAMPLE 1

The procedure described in Example 1 is repeated, except that 8.5 parts of an unmodified fume silica (silicon dioxide obtained pyrogenically in the gaseous phase) having a surface area of 150 m$^2$/g are substituted for 8.5 parts of the modified filler.

COMPARISON EXAMPLE 2

The procedure described in Example 1 is repeated, except that 8.5 parts of a mixture containing 94 percent of an unmodified fume silica having a surface area of 150 m$^2$/g and 6 percent of a polyacrylonitrile powder are substituted for 8.5 parts of the modified filler. About 99.5 percent of the mixture consists of particles less than 90 micrometers.

Samples of the compositions prepared in accordance with the procedure described in Example 1 and in the Comparison Examples were applied as a layer 5 mm in thickness between two parallel plates measuring 10 mm × 50 mm, which plates were made of the materials indicated in the following Table. After storing for one week at room temperature while being exposed to atmospheric moisture, the plates were separated at the rate of 12 mm per minute. The results are indicated in Table 1.

The tensile strength of the elastomers are also shown in the following Table.

TABLE 1

| | Type of Tear in Elastomer | | | | |
|---|---|---|---|---|---|
| | Compositions of Example 1 | | | Compositions of Comparison Examples | |
| Plates | (a) | (b) | (c) | 1 | 2 |
| Tin Plate | K | K | AK | A | A |
| Pine* | K | K | K | AK | AK |
| Mahogany* | K | K | K | AK | AK |
| Douglas Fir | K | K | K | AK | AK |

| Tensile Strength of Elastomers of Example Example 1 (N/mm$^2$) | | | Tensile Strength of Elastomers of Comparison Examples | |
|---|---|---|---|---|
| (a) | (b) | (c) | 1 | 2 |
| 1.35 | 1.31 | 1.19 | 1.08 | 1.1 |

A = Adhesion tear - (separation between coating and slab)
K = Cohesion tear - (tear in coating)AK = Adhesion + cohesion tear
*Wood coated with "Xyladecor", a colorless wood preservative.

EXAMPLE 2

The process described in Example 1 was repeated, except that 8.5 parts of filler prepared in (d) above were substituted for the modified filler used in Example 1.

EXAMPLE 3

The process described in Example 1 was repeated, except that 8.5 parts of filler prepared in (e) above were substituted for the modified filler of Example 1.

The results are shown in Table 2.

TABLE 2

| Plates | Type of Tear in Elastomer Examples | |
|---|---|---|
|  | 2 | 3 |
| Glass | K | K |
| Tin Plate | AK | AK |
| Aluminum | K | K |
| Pine | K | K |
| Mahogany | K | K |
| Douglas Fir | K | K |

| Tensile Strength of Elastomer of Examples (N/mm$^2$) | |
|---|---|
| 2 | 3 |
| 1.29 | 1.26 |

What is claimed is:

1. A room temperature vulcanizable composition which may be stored under anhydrous conditions, but when exposed to atmospheric moisture, cures to form an elastomer, comprising a diorganopolysiloxane having terminal condensable groups, a silicon compound having at least three Si-bonded hydrolyzable groups and an inorganic filler having a surface area of at least 20 m$^2$/g, in which at least a portion of the surface of the inorganic filler contains a polymer obtained from the polymerization, in the presence of the filler of at least one compound of the formula $$HR^1C=CHX,$$

where X is selected from the group consisting of a —CN group or a group of the formula —COOR$^2$, R$^2$ is an alkyl radical having from 1 to 4 carbon atoms and R$^1$ is selected from the group consisting of hydrogen and a methyl radical.

2. The room temperature vulcanizable composition of claim 1, wherein at least a portion of the surface of the inorganic filler contains a copolymer obtained from the polymerization of a mixture containing (1) a compound of the formula $$HR^1C=CHX$$

where X is selected from the group consisting of a —CN group or a group of the formula —COOR$^2$, R$^2$ is an alkyl radical having from 1 to 4 carbon atoms and R$^1$ is selected from the group consisting of hydrogen and a methyl radical and (2) at least one monomer which is capable of being copolymerized with compound (1).

3. The compositions of claims 1 or 2, wherein the inorganic filler having a surface area of at least 20 m$^2$/g and having a polymer formed on its surface has a carbon content of from 0.2 to 7 percent by weight based on the weight of the inorganic filler.

4. The composition of claims 1 or 2, wherein the inorganic filler having a surface area of at least 20 m$^2$/g and having a polymer formed on its surface is present in an amount of from 3 to 35 percent by weight based on the total weight of the composition.

5. The composition of claims 1 or 2, wherein the inorganic filler having a surface area of at least 20 m$^2$/g and having a polymer formed on its surface is present in an amount of from 4 to 12 percent by weight based on the total weight of the composition.

* * * * *